US005595577A

United States Patent [19]
Bensalem et al.

[11] Patent Number: 5,595,577
[45] Date of Patent: Jan. 21, 1997

[54] METHOD FOR MAKING A CARBONACEOUS HEAT SOURCE CONTAINING METAL OXIDE

[76] Inventors: Azzedine Bensalem, 134 Joralemon St., Brooklyn, N.Y. 11201; Sarojini Deevi; Seetharama C. Deevi, both of 8519 Whirlaway Dr., Midlothian, Va. 23112; Donald M. Schleich, La Riaudiere, Carquefou 44470, France

[21] Appl. No.: 444,943

[22] Filed: May 19, 1995

Related U.S. Application Data

[62] Division of Ser. No. 71,313, Jun. 2, 1993, Pat. No. 5,468,266.

[51] Int. Cl.$^6$ ............................. C10L 9/00; C10L 11/00
[52] U.S. Cl. ........................... 44/629; 131/194; 131/330
[58] Field of Search ......................... 44/591, 598, 599, 44/504, 542, 629; 131/330, 194, 337, 369

[56] References Cited

U.S. PATENT DOCUMENTS

| | | | |
|---|---|---|---|
| 1,771,366 | 7/1930 | Wyss et al. | |
| 2,104,266 | 1/1938 | McCormick | 131/12 |
| 2,907,686 | 10/1959 | Siegel | 131/2 |
| 3,152,985 | 10/1964 | Stoertz | 216/48 |
| 3,200,819 | 8/1965 | Gilbert | 128/208 |
| 3,258,015 | 6/1966 | Ellis et al. | 131/171 |
| 3,356,094 | 12/1967 | Ellis et al. | 131/266 |
| 3,943,941 | 3/1976 | Boyd et al. | 131/2 |
| 4,141,369 | 2/1979 | Burrus | 131/171 |
| 4,146,934 | 4/1979 | Cohen | 2/127 |
| 4,303,083 | 12/1981 | Burruss, Jr. | 131/271 |
| 4,317,460 | 3/1982 | Dale et al. | 131/334 |
| 4,340,072 | 7/1982 | Bolt et al. | 131/273 |
| 4,708,151 | 11/1987 | Shelar | 131/359 |
| 4,714,082 | 12/1987 | Banerjee et al. | 131/359 |
| 4,732,168 | 3/1988 | Resce et al. | 131/359 |
| 4,756,318 | 7/1988 | Clearman et al. | 131/359 |
| 4,771,795 | 9/1988 | White et al. | 131/194 |
| 4,799,979 | 1/1989 | Baldi | 149/5 |
| 4,858,630 | 8/1989 | Banerjee et al. | 131/364 |
| 4,991,606 | 2/1991 | Serrano et al. | 131/359 |
| 5,040,551 | 8/1991 | Schlatter et al. | 131/359 |
| 5,040,552 | 8/1991 | Schleich et al. | 131/359 |
| 5,076,296 | 12/1991 | Nystrom et al. | 131/359 |
| 5,076,297 | 12/1991 | Farrier et al. | 131/369 |
| 5,188,130 | 2/1993 | Hajaligol et al. | 131/359 |
| 5,211,684 | 5/1993 | Shannon | 131/352 |
| 5,240,014 | 8/1993 | Deevi et al. | 131/334 |
| 5,246,018 | 9/1993 | Deevi et al. | 131/359 |
| 5,247,949 | 9/1993 | Deevi et al. | 131/359 |
| 5,468,266 | 11/1995 | Bensalem et al. | 44/452 |

FOREIGN PATENT DOCUMENTS

| | | | |
|---|---|---|---|
| 494784 | 7/1992 | European Pat. Off. | A24B 15/16 |
| 117355 | 6/1994 | European Pat. Off. | A24B 15/18 |

OTHER PUBLICATIONS

Leary et al., *Journal of Catalysis*, 101, pp. 301–313 (1986). No month available.
Haruta et al., *Journal of Catalysis*, 115, pp. 301–309 (1989). No month available.
Walker et al., *Journal of Catalysis*, 110, pp. 298–309 (1988). No month available.

Primary Examiner—Margaret Medley
Attorney, Agent, or Firm—James T. Moore; James E. Schardt; Charles E. B. Glenn

[57] ABSTRACT

A carbonaceous heat source comprising metal oxides and methods for making such heat source are provided. The heat source has an ignition temperature substantially lower than conventional carbonaceous heat sources, while at the same time produces virtually no carbon monoxide upon combustion. The heat source is prepared by pre-forming the carbon and binder materials into a desired shape, and then treating the shape with a sol containing metal oxide precursors. The metal oxide precursors are deposited in the pre-formed carbon shape. Further treatment converts the deposited metal oxide precursors into metal oxide.

33 Claims, 4 Drawing Sheets

METHOD FOR MAKING A CARBONACEOUS HEAT SOURCE CONTAINING METAL OXIDE

This application is a divisional of application Ser. No. 08/071,313 filed on Jun. 2, 1993, now U.S. Pat. No. 5,468,266.

BACKGROUND OF THE INVENTION

This invention relates to an improved carbonaceous heat source and to the conversion of gaseous by-products, such as carbon monoxide, produced by the combustion of the carbonaceous heat source and methods to make such a heat source. The methods and heat source of this invention are particularly suitable for use in a smoking article such as that described in U.S. Pat. No. 4,991,606 commonly assigned herewith. The heat sources of this invention comprise a carbonaceous material and smaller amounts on a weight basis of a metal oxide. The heat sources of this invention have low ignition temperatures and high combustion temperatures. Upon combustion, the metal oxide component of the heat source chemically converts substantially all of the carbon monoxide to a benign substance.

According to this invention, carbon or a material that can be subsequently converted to carbon is pre-formed into a shape. The pre-formed carbonaceous material is treated with a sol which comprises a metal oxide precursor that subsequently can be converted to a metal oxide. This results in the deposition of the metal oxide precursor into the pre-formed carbonaceous material. The pre-formed carbonaceous material is further treated to convert the deposited metal oxide precursor into metal oxide, thus producing a heat source with a low ignition temperature, durability for handling, a large heat release during combustion, and low emission of carbon monoxide during combustion that can be produced by a simplified method.

There have been previous attempts to provide a heat source for a smoking article. While providing a heat source, these attempts have not produced a heat source having all of the advantages of the present invention.

For example, Siegel U.S. Pat. No. 2,907,686 describes a charcoal rod coated with a concentrated sugar solution which forms an impervious layer during burning. It was thought that this layer would contain gases formed during smoking and concentrate the heat thus formed.

Ellis et al. U.S. Pat. No. 3,258,015 and Ellis et al. U.S. Pat. No. 3,356,094 describe a smoking device comprising a nicotine source and a tobacco heat source.

Boyd et al. U.S. Pat. No. 3,943,941 describes a tobacco substitute which consists of a fuel and at least one volatile substance impregnating the fuel. The fuel consists essentially of combustible, flexible and self-coherent fibers made of a carbonaceous material containing at least 80% carbon by weight. The carbon is the product of the controlled pyrolysis of a cellulose-based fiber containing only carbon, hydrogen and oxygen.

Bolt et al. U.S. Pat. No. 4,340,072 describes an annular fuel rod extruded or molded from tobacco, a tobacco substitute, a mixture of tobacco substitute and carbon, other combustible materials such as wood pulp, straw and heat-treated cellulose or a sodium carboxymethylcellulose (SCMC) and carbon mixture.

Shelar et al. U.S. Pat. No. 4,708,151 describes a pipe with replaceable cartridge having a carbonaceous fuel source. The fuel source comprises at least 60–70% carbon, and most preferably 80% or more carbon, and is made by pyrolysis or carbonization of cellulosic materials such as wood, cotton, rayon, tobacco, coconut, paper and the like.

Banerjee et al. U.S. Pat. No. 4,714,082 describes a combustible fuel element having a density greater than 0.5 gm/cc. The fuel element consists of comminuted or reconstituted tobacco and/or a tobacco substitute, and preferably contains 20%–40% by weight of carbon.

Published European patent application 0 117 355 by Hearn et al. describes a carbon heat source formed from pyrolized tobacco or other carbonaceous material such as peanut shells, coffee bean shells, paper, cardboard, bamboo, or oak leaves.

Published European patent application 0 236 992 by Farrier et al. describes a carbon fuel element and process for producing the carbon fuel element. The carbon fuel element contains carbon powder, a binder and other additional ingredients, and consists of between 60% and 70% by weight of carbon.

Published European patent application 0 245 732 by White et al. describes a dual burn rate carbonaceous fuel element which utilizes a fast burning segment and a slow burning segment containing carbon materials of varying density.

These heat sources are deficient because they provide unsatisfactory heat transfer to the flavor bed, resulting in an unsatisfactory smoking article, i.e., one which fails to simulate the flavor, feel and number of puffs of a conventional cigarette.

U.S. Pat. No. 5,076,296 commonly assigned herewith, solved this problem by providing a carbonaceous heat source formed from charcoal that maximizes heat transfer to the flavor bed, thereby releasing a flavored aerosol from the flavor bed for inhalation by the smoker, while minimizing the amount of carbon monoxide produced.

However, all conventional carbonaceous heat sources liberate some amount of carbon monoxide gas upon ignition. Moreover, the carbon contained in these heat sources has a relatively high ignition temperature, making ignition of conventional carbonaceous heat sources difficult under normal lighting conditions for a conventional cigarette.

Attempts have been made to produce non-combustible heat sources for smoking articles, in which heat is generated electrically (e.g., Burruss, Jr., U.S. Pat. No. 4,303,083, Burruss U.S. Pat. No. 4,141,369, Gilbert U.S. Pat. No. 3,200,819, McCormick U.S. Pat. No. 2,104,266 and Wyss et al. U.S. Pat. No. 1,771,366). These devices are impractical and none has met with any commercial success.

Attempts have been made to produce pyrophoric materials comprising metal aluminides that will burn in a controlled fashion, thereby allowing their use as a decoy for heat-seeking missiles (e.g., Baldi, U.S. Pat. No. 4,799,979). These devices, however, combust too rapidly and produce too intense a heat to be used as a heat source in a smoking article.

Attempts have been made to produce a combustible, non-carbonaceous heat source.

U.S. Pat. No. 5,040,552 commonly assigned herewith, is directed to a metal carbide heat source which produces tenfold less carbon monoxide than conventional carbon heat sources.

U.S. Pat. No. 5,188,130 commonly assigned herewith, relates to a metal nitride heat source that also produces substantially no carbon monoxide or nitrogen oxides upon combustion.

Co-pending U.S. Pat. No. application Ser. No. 07/556,732, filed on Jul. 20, 1990 (PM-1347), and commonly assigned herewith, is directed to a heat source comprising carbon and metal carbide that also produces substantially no carbon monoxide or nitrogen oxides upon combustion.

Co-pending U.S. Pat. No. application Ser. No. 07/639,241, filed on Jan. 9, 1991 (PM-1336), and commonly assigned herewith, is directed to a metal carbide heat source that also produces substantially no carbon monoxide upon combustion.

U.S. Pat. No. 4,146,934 commonly assigned herewith, is directed to heat sources comprising a mixture of metal carbide, metal nitride and metal which undergo a staged ignition process.

Co-pending U.S. Pat. No. application Ser. No. 07/732,619, filed on Jul. 19, 1991 (PM-1353), and commonly assigned herewith, is directed to a carbonaceous heat source containing a metal species that produces substantially no carbon monoxide upon combustion.

There have been attempts to remove carbon monoxide from gaseous combustion products.

Dale U.S. Pat. No. 4,317,460 describes an oxidation catalyst adsorbed onto a solid support. The catalyst may be located in either a smoking article or in a filter tip.

Leary et al., *Journal of Catalysis*, 101, pp. 301–13 (1986) refers to a catalyst for the oxidation of carbon monoxide produced by an internal combustion engine. These catalysts, however, are derived from expensive metals.

Haruta et al., *Journal of Catalysis*, 115, pp. 301–309 (1989) refers to production of an oxidation catalyst for the low-temperature conversion of carbon monoxide.

Walker et al., *Journal of Catalysis*, 110, pp. 298–309 (1988) refers to an iron oxide-based catalyst for the simultaneous oxidation of carbon monoxide and propane.

Published PCT patent application 90/04930 by Schlatter et al. describes a carbonaceous fuel element having coated on its surface a metal catalyst which reduces carbon monoxide emissions.

These attempts have not produced a composition having all of the advantages of the present invention.

It would be desirable to provide a heat source that liberates substantially no carbon monoxide upon combustion.

It would also be desirable to provide a heat source that has a low temperature of ignition to allow for easy lighting under conditions typical for a conventional cigarette, while at the same time providing sufficient heat to release flavors from a flavor bed.

It would also be desirable to provide a durable heat source produced by simplified manufactured techniques.

SUMMARY OF THE INVENTION

It is an object of this invention to provide a heat source that liberates substantially no carbon monoxide upon combustion.

It is also an object of this invention to provide a heat source that has a low ignition temperature to allow for lighting under conditions typical for a conventional cigarette, while at the same time providing sufficient heat to release flavors from a flavor bed.

It is an additional object of this invention to provide a durable heat source that can be produced by simplified manufacturing techniques.

In accordance with this invention, there is provided a durable carbonaceous heat source containing small amounts of metal oxide that can be produced by using a sol to deposit the metal oxide within the carbonaceous material.

BRIEF DESCRIPTION OF THE DRAWINGS

The above and other objects and advantages of this invention will be apparent upon consideration of the following detailed description, taken in conjunction with the accompanying drawings, in like reference characters refer to like parts throughout, and in which.

DETAILED DESCRIPTION OF THE INVENTION

Figure 1:
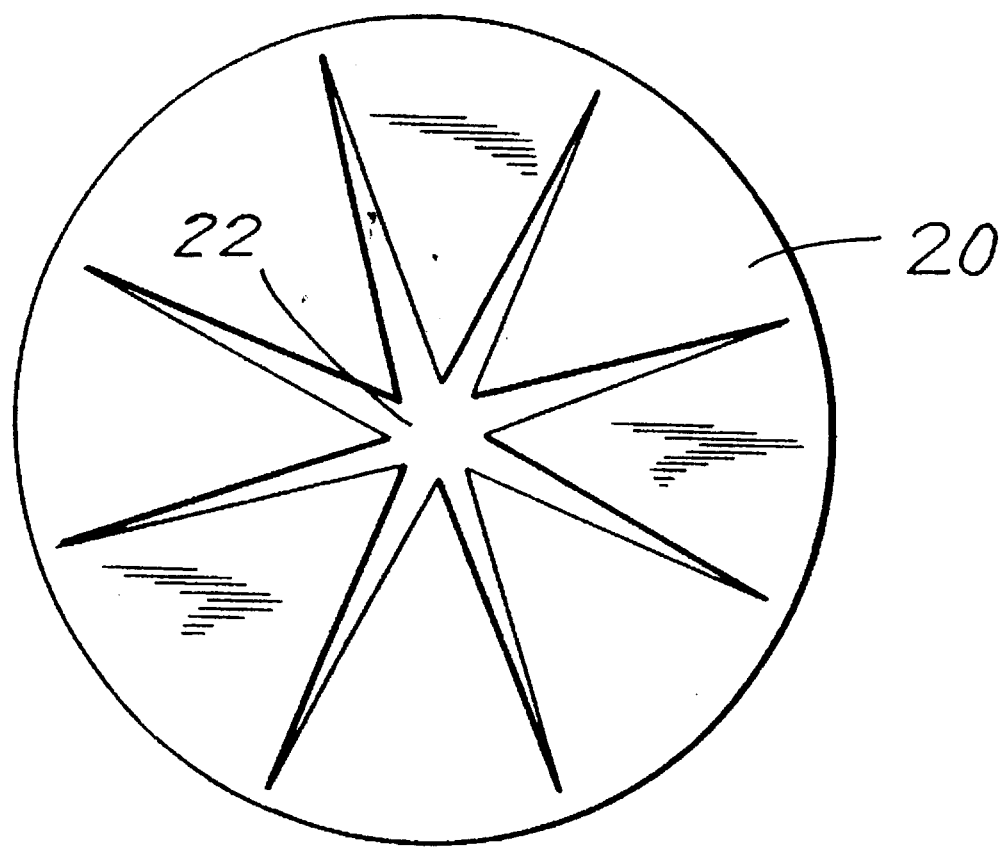
FIG. 1 depicts an end view of one embodiment of the heat sources of this invention.

The heat source should produce substantially no carbon monoxide upon combustion. Combustion, the interaction of the heat source with oxygen during puffing to produce heat and light, should be flameless and glowing.

The heat source should have an appropriate thermal conductivity. If too much heat is conducted away from the burning zone to other parts of the heat source, combustion at that point will cease when the temperature drops below the extinguishment temperature of the heat source resulting in a heat source which is difficult to light and which, after lighting, is subject to premature self-extinguishment. Such premature self-extinguishment is also prevented by having a heat source that undergoes essentially 100% combustion.

When used in a smoking article, the heat source should meet a number of additional requirements in order for the smoking article to perform satisfactorily. It should be small enough to fit inside the smoking article and still burn hot enough to ensure that gases flowing through are heated sufficiently to release enough flavor from the flavor bed to provide flavor to the smoker. Ease of lighting of the smoking article is also accomplished by having a heat source with an ignition temperature that is sufficiently low to permit easy lighting under normal conditions for a conventional cigarette.

The heat source can be manufactured according to the following processes. Carbonaceous material is used to make the intermediate carbon rods which in turn are used to make the final heat sources of this invention. The carbon may be derived from various carbonaceous materials such as wood, wood bark, peanut shells, coconut shells, tobacco, rice hulls, or any cellulose or cellulose-derived material that has a high carbon yield. These carbon-yielding precursors are carbonized using a semi-oxidizing process similar to that used to make wood charcoal or the bark fly ash process as described in U.S. Pat. No. 3,152,985. Preferably, a softwood charcoal is used to produce the intermediate carbon rods. Softwood charcoal is not as dense as hardwood charcoal, thereby making softwood charcoal easier to burn.

The carbon may be activated or unactivated. Generally, activating the carbon increases the carbon's effective surface area. Increased effective surface area is important because this allows more oxygen to be present at the point of combustion, thus increasing ease of ignition and burning and providing minimal residue. Carbon with a high surface area is desirable because it yields a hotter burning heat source. However, extremely high surface area materials, surface areas above 1500–2 $m^2$/gm, are detrimental to the carbonaceous heat source. This is so because the carbon material will have too high a porosity and a heat source prepared from such a carbon will be structurally weak and will not possess the durability required for subsequent handling during manufacturing. The surface area of the carbon particles should be in the range from between about 100 $m^2$/gm and about 800 $m^2$/gm, or from between about 200 $m^2$/gm and about 800 $m^2$/gm. This will allow for adequate penetration of the sol into the pores of the heat source, while at the same time provide for sufficient structural stability to the heat source.

The size of the carbon particles is also important in determining the properties of the final heat source. Smaller particles provide more surface area. The size of these carbon particles can be up to about 300 microns. Preferably, these carbon particles have an average particle size of between submicron and about 40 microns.

The particles may be prepared at the desired size or they may be prepared at a larger size and ground down to the desired size. Various types of mills or other grinders may be used to grind the carbon to the desired size. Preferably a jet mill is used.

After the carbon is ground to the desired size, it is mixed with the binders. The binder used to bind the carbon particles together is preferably a two-part binder system using relatively pure raw materials. The preferred binder is a flour such as the flour of wheat, barley, corn, oat rye, rice, sorghum, mayo, or soybean. The high protein (12–16%) or high gluten (12–16%) flours of those listed above are preferred. Even more preferred is a high protein wheat flour. A higher protein level in the flour is preferable because the higher protein level increases the binding properties of the flour, thus increasing the physical strength of the final carbon heat source. Another preferred binder is a monosaccharide or disaccharide sugar, preferably sucrose (table sugar). The use of sucrose reduces the amount of flour needed. It also aids in the extrusion of the mixture. These binders form a relatively reactive carbon material upon carbonization. It is also possible to produce a carbon heat source with a one binder system of flour or other well-known binders, for example, sodium carboxymethyl cellulose (SCMC). The SCMC may be used in combination with other additives, such as, sodium chloride, vermiculite, bentonite or calcium carbonate. Other binders that may be used include gums, such as guar gum, other cellulose derivatives (i.e., methylcellulose, carboxymethylcellulose and hydroxypropyl cellulose), starches, alginates, and polyvinyl alcohols.

Varying concentrations of binders can be used, but it is desirable to minimize the binder concentration to reduce the thermal conductivity and improve the burn characteristics of the heat source. The binders used are carbonized upon heating and leave behind a carbon skeleton sufficient to bind the carbon particles together. The carbonizing process minimizes the likelihood that undesirable complex products will be formed from the uncarbonized binders during combustion of the heat source. The use of small carbon particles allows the use of less binder materials.

Certain burn additives also may be used to either lower the ignition temperature or to otherwise aid in the combustion of the heat source. This aid may take the form of promoting combustion of the heat source at a lower temperature or with lower concentrations of oxygen or both. Such burn additives typically include oxidants such as perchlorates, chlorates, nitrates, permanganates, or any substance which burns faster than the fuel elements. Burn additives may be present in the heat source in an amount between about 0.05% and 10% by weight of the heat source, preferably between about 0.2% and 4%.

The ground carbon particles are mixed with the binder, water, and, if desired, one or more burn additives. In the preferred embodiment, about 4% to about 45% of a high protein wheat flour; about 1% to about 14% of sugar; about 20% to about 95% of carbon; and up to about 8% of potassium citrate is used. More preferably about 7% to about 30% of a high protein wheat flour; about 3% to about 20% sugar; about 50% to about 85% of carbon; and about 2.7% to about 5% of potassium citrate is used. Water is added in an amount sufficient to form an extrudable paste from the mixture.

The period of time for mixing can be determined by routine experimentation. The mixing should ensure thorough distribution of the various substances. Preferably, if a large volume is to be mixed in a batch mode, mixing should be for about 15 minutes to about one hour. If a small volume is to be mixed in a continuous mode, mixing need only be for a few seconds.

The mixture may then be formed into a desired shape. Any method of forming the mixture may be used. Preferred methods include slip casting, injection molding, and die compaction, and, most preferably, extrusion.

The method by which the intermediate carbon shapes are manufactured will, in part, determine the amount of binder added to the mixture. For example, methods of manufacture which rely upon pressure, such as die compaction, injection molding and slip casting, require lesser amounts of binder than methods such as extrusion.

Figure 2:
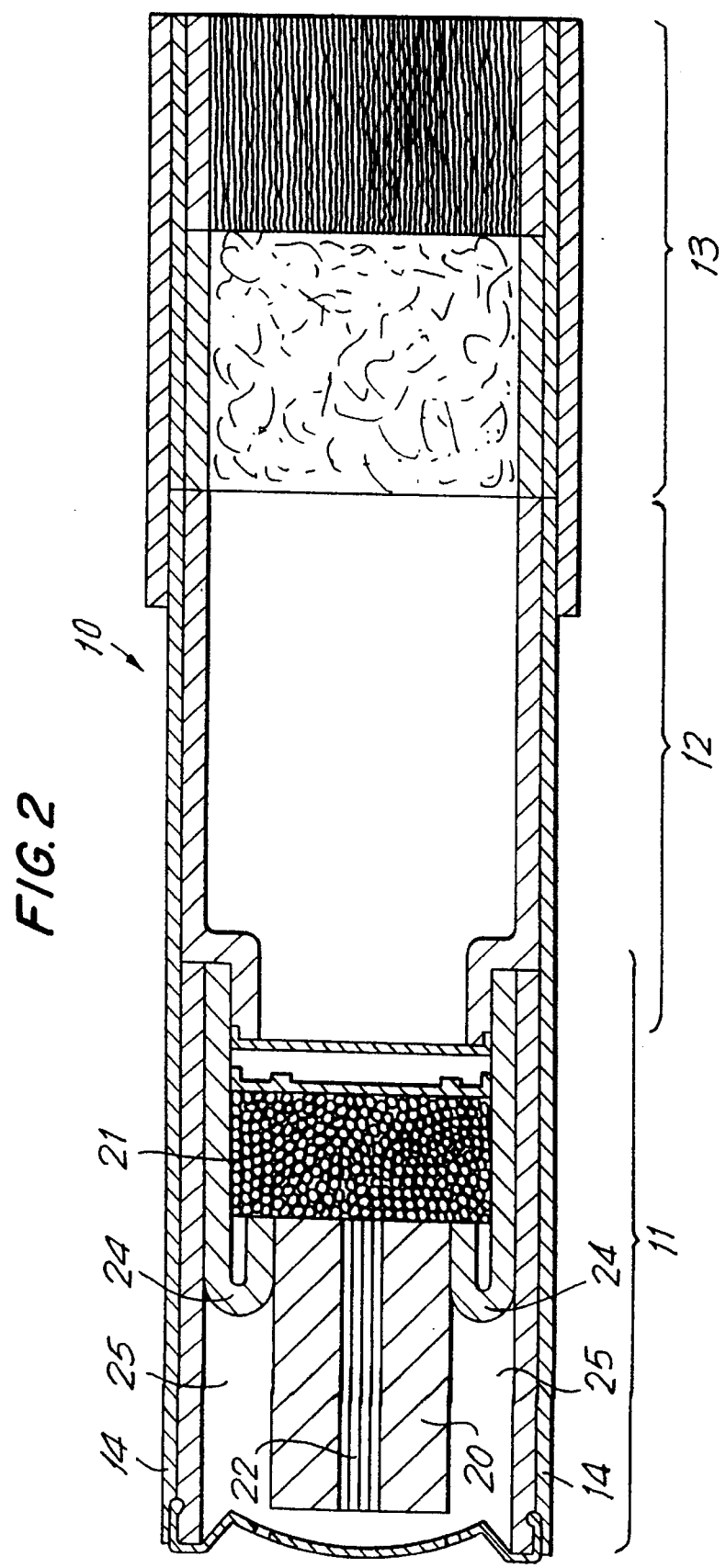
FIG. 2 depicts a longitudinal cross-sectional view of as smoking article in which the heat source of this invention may be used.

Those skilled in the art will understand that a particular application may require a particular shape. When the heat source is to be used in a smoking article, one or more longitudinal air flow passageways may be formed through the heat source, in order to maximize the transfer of heat from the heat source to flavor bed. The longitudinal air flow passageways should have a large geometric surface area to aid the heat transfer to the air flowing through the heat source. The shape and number of the longitudinal air flow passageways should be chosen such that the internal geometric surface area of the heat source is equal to or greater than the external geometric surface area. Preferably, when longitudinal air flow passageways such as those depicted in FIG. 1 are used, maximization of heat transfer to the flavor bed is accomplished by forming each longitudinal air flow passageway 22 in the shape of a multipointed star. More preferably, as set forth in FIG. 2, each multipointed star should have long narrow points and a small inside circumference defined by the innermost edges of the star. These star-shaped longitudinal air flow passageways provide a larger combustion area resulting in a greater volume of carbon being involved in combustion and therefore a hotter burning heat source.

In a preferred embodiment, the mixture is formed into an elongated rod, called a green rod. The length of the green rod determines the amount of static burn time as well as the number of puffs to the smoker. The preferred length of the heat source is such to provide a similar static burn time and number of puffs to the smoker as would a conventional cigarette. Therefore, preferably, the green rod is about 30 cm in length. The diameter for the heat source may range from about 3.0 mm to about 8.0 mm; preferably between about 4.0 mm and about 5.0 mm. A final diameter of about 4.0 mm allows an annular air space around the heat source without causing the diameter of the smoking article to be larger than that of a conventional cigarette. Therefore the diameter of the green rod is preferably about 4.0 mm.

After formation, the green rods are dried to a moisture content of between about 2% and about 11%, preferably between about 4% and about 6%. The dried green rods are then baked in an inert atmosphere at a temperature sufficient to carbonize the binders and drive off volatiles from the green rods. Typically, the green rods are baked at a temperature between about 260° C. and about 1650° C., preferably between about 760° C. and about 980° C. The baking temperature must be high enough to vaporize any solvent contained in the green rods. The resulting products of this baking step are called intermediate carbon rods.

Once the green rods have been converted into intermediate carbon rods having the desired shape and size, they are treated with a sol.

The sol comprises metal oxide precursors. Suitable metal oxide precursors are those which may be converted into metal oxides that react with carbon monoxide. Metal oxides that react with carbon monoxide are oxides of aluminum, chromium, cobalt, vanadium, silicon, germanium, gallium, indium, platinum, and palladium. More preferably, the metal oxide is iron oxide and, most preferably, ferric oxide. Therefore, in the preferred embodiment, the metal oxide precursors include metal sulfates, metal nitrates, metal oxalates such as iron oxalates, metal acetyl acetonates such as iron acetyl acetonate, hydrated metal nitrates and metal chlorides and, most preferably, iron nitrates and hydrated iron nitrates.

The sol also comprises a hydroxylated organic chemical. Preferably, the hydroxylated organic chemical is a diol or triol and, more preferably, ethylene glycol or propylene glycol. The metal oxide precursor, is added to the hydroxylated organic chemical, where upon heating to between about 60° C. and 150° C. it reacts to form a polymeric or oligomeric species containing iron and organic species. The sol viscosity must not be so high that it cannot readily permeate the carbonaceous material. In addition it is desireable that the sol have good wetting characteristics to aid in the absorption of the sol by the intermediate carbon rods.

In a preferred embodiment of the present invention, the sol is prepared in the following way. The metal oxide precursor is dissolved in ethylene glycol so that the metal oxide precursor concentration is 10%, by weight. This solution is stirred at an elevated temperature of between about 60° C. and 150° C. under a dry atmosphere until the solution increases its viscosity. This heating time will vary depending on the temperature to which the sol is heated. For example, a sol heated at 80° C. will achieve a substantial increase in its viscosity after about 10 hours.

The intermediate carbon rod is then treated with the sol. Any method of treating the intermediate carbon rod such that the sol penetrates the intermediate carbon rod is appropriate. Preferably, the intermediate carbon rod is painted, dipped or immersed with the sol. More preferably, to facilitate high speed manufacturing, the intermediate carbon rod is sprayed with the sol as the carbon rod is moved on a conveyor belt. The spraying of the sol can be accomplished with any one of several different types of nozzles. Gas-assisted high pressure spraying of the sol will aid in the penetration of the sol into the porous intermediate carbon rod. High pressure spraying of the sol will enable an increase in the manufacturing speed while at the same time will allow for the sol to penetrate more deeply into the intermediate carbon rod than will ambient pressure spraying. Spraying should be carried out with nozzles which will provide very fine droplets of sol in the size range of between about $0.05\mu$ and $200\mu$, and preferably between about $0.05\mu$ and $40\mu$.

The greater the duration of treatment of the intermediate carbon rod with the sol, the greater the amount of sol (and, consequently, the amount of metal oxide precursor) that penetrates into the intermediate carbon rod. Increasing the duration of treatment of the intermediate carbon rod improves the catalytic conversion properties of the final heat source but decreases the heat source's ignition properties and physical strength. Thus, a balance must be struck between the desired catalytic properties of the final heat source and its ignition and physical properties. This balance may be found by routine experimentation.

For example, for an intermediate carbon rod it has been found that spraying between about 0.5% and 6% of sol, by weight of the carbon rod, will achieve the desired characteristics. When using the immersion technique to apply the sol to an intermediate carbon rod, between about one minute and about ten minutes or between 5 minutes and 10 minutes immersion time has been found to achieve the desired characteristics. With the immersion treatment, immersion times in excess of 15 minutes will result in a carbon rod that is powdery.

Once the intermediate carbon rod has been treated with the sol, it is baked to produce the final carbon heat source. Preferably, the treated intermediate carbon rod is baked at a temperature of between about 100° C. to about 400° C. for about 90 minutes in a ramp heating cycle or between about 150° C. and about 300° C. for about 60 minutes. Initial slow heating at a rate of between about 0.5° C./min. and 10° C./min. is needed to remove substantially all fluids from the treated intermediate carbon rod. After evaporation of the liquid, the remaining components of the sol undergo decomposition to form a metal oxide. If a metal nitrate sol is used, the metal nitrate must be allowed to decompose to a metal oxide, otherwise the metal nitrate when decomposed during the combustion of the heat source will give rise to nitric oxides which are undesirable by-products when the heat source is used in a smoking article. The percent of decomposition of the sol to oxide can be determined by thermal gravimetric analysis (TGA).

The resulting product is the carbon heat source. It is believed that the heating of the sol-treated intermediate carbon rod converts the deposited metal oxide precursors to the metal oxides or mixed metal oxides as well as drys the treated intermediate carbon rod. In addition when an iron oxide precursor is used in the sol, this low temperature treatment allows for the formation of iron oxide ($Fe_2O_3$) in a highly active state.

It has been found that the amount of metal oxide deposited within the heat source is inversely related to the amount of carbon monoxide generated upon combustion of the heat source up to between 5% and about 6%. There should be a detectable increase in the weight of the final heat source over the weight of the intermediate carbon rod. This weight increase is caused by the addition of metal oxide. To maximize the beneficial effect on the reduction in carbon monoxide evolution and optimize ignition characteristics, this weight increase should be between about 0.1% and about 20%. Preferably, the heat source undergoes a weight increase due to the metal oxide of between about 2% and about 15%, about 4% and about 8% or about 4% and about 6%.

The preferred density of the heat source optimizes the amount of carbon, metal oxide and available oxygen at the point of combustion. Theoretically, the density can be as high as 2.25 gm/cc, which is substantially similar to pure carbon in its graphite form. However, if the density becomes too high, the void volume of the heat source will be too low. Low void volume of the heat source means that there is less oxygen available at the point of combustion, resulting in a heat source that is harder to ignite and sustain combustion. However, this problem can be solved by the addition of a burn additive to the heat source. Burn additives that may be used are referred to above and include such oxidizing agents as potassium nitrate, potassium chlorates, potassium perchlorates, ammonium nitrates and ammonium perchlorates are very effective in very small quantities in catalyzing the ignition temperature. The burn additive is added at the same time as the binders. If a burn additive is added to the heat source, it is possible to use a dense heat source, i.e., a heat source with a small void volume having a density approaching 2.25 gm/cc. The particle size of the metal oxide is between about 200 Å and about 40μ or preferably between about 800 Å and 5μ, and the surface area of the metal oxide is between about 4.0 m$^2$/gm and about 200 m$^2$/gm. Preferably, the density of the heat source is between about 0.4 gm/cc and 2.25 gm/cc or about 1 gm/cc and, most preferably between about 0.5 gm/cc and 1.5 gm/cc.

Those of skill in the art will appreciate that the rods may be exposed to the sol one or more times, and that the number of times the rods are exposed to the sol has an effect on the amount of metal oxide ultimately found deposited in the heat source. For example, a single dip of less than 2 minutes generally results in a weight increase of less than about 5%. Greater amounts of metal oxide may be deposited either by increasing the number of times the rod is exposed to the sol, the duration of exposure, or both.

EXAMPLE 1

Preparation of Iron Oxide Sol

An iron oxide sol was prepared by dissolving hydrated iron (III) nitrate (Fe(NO$_3$)$_3$.9 H$_2$O) in ethylene glycol. The concentration of iron nitrate in ethylene glycol was 10%, by weight. The solution was then stirred at 80° C. under a nitrogen flow. After 10 hours at 80° C., the solution lost its fluidity and substantially increased its viscosity. When the sol was dried in air at 200° C. for 3 hours it resulted in a dark brown powder. The characterization of the sol as well as the resulting dark brown powder was performed using TGA and X-ray powder diffraction. This result indicated that at 220° C. all the ethylene glycol was evaporated and the polymeric or oligomeric species present in the sol had decomposed. Infrared spectroscopy as well as X-ray powder diffraction showed that the obtained powder was crystalline Fe$_2$O$_3$. T.G.A. of the sol allowed the calculation of the concentration of iron metal and indicated that the prepared sol contained 2.0% by weight of iron metal.

EXAMPLE 2

Treatment of Carbon Pellets With the Sol

Iron oxide was deposited within the intermediate carbon rods by immersing the rods in the iron oxide sol of Example 1 for two minutes and then drying at 150° C. in air for 2 hours. A weight increase of 5% in the final carbon heat source resulted from the deposited iron oxide.

EXAMPLE 3

Figure 3:
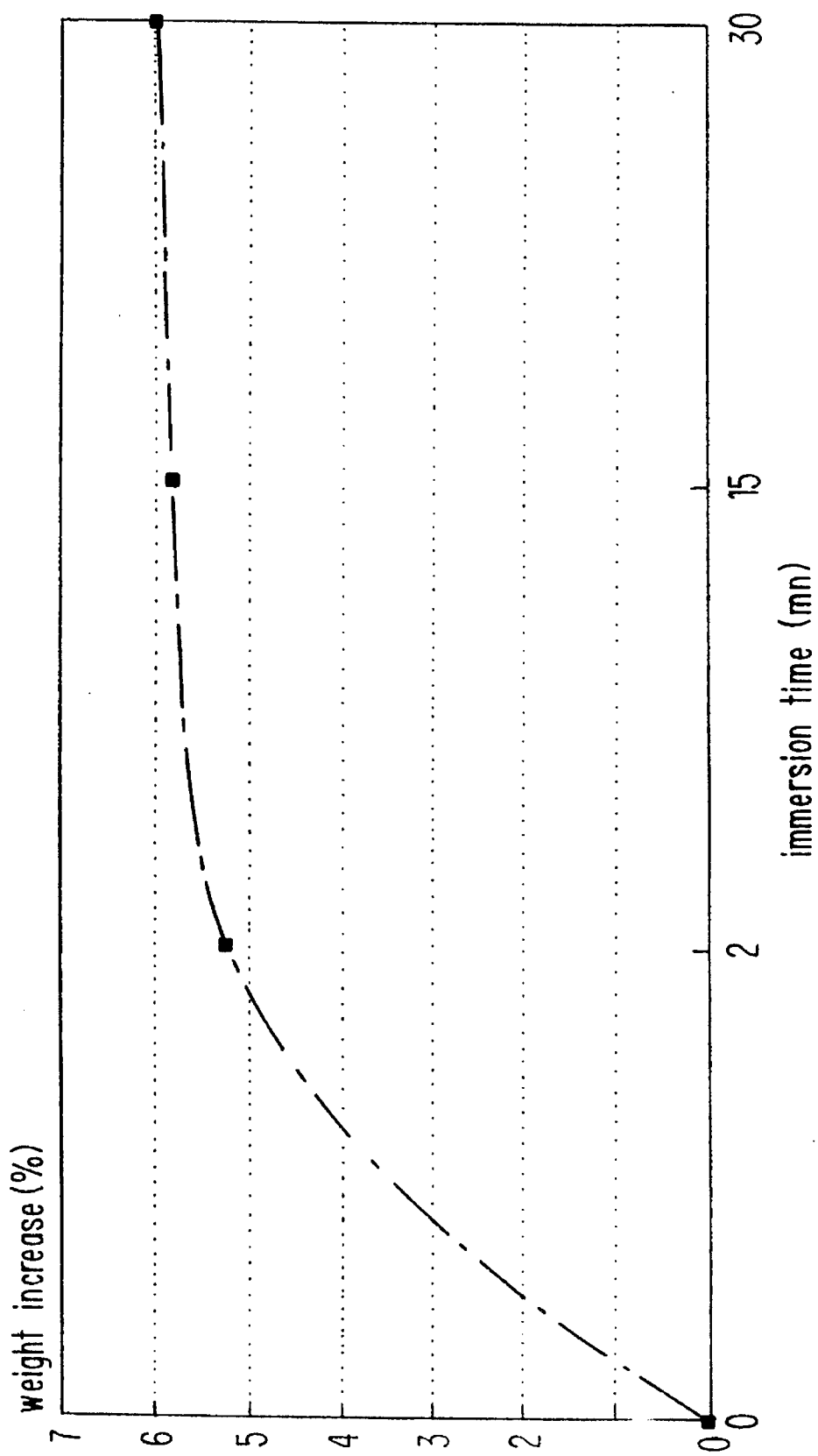
FIG. 3 depicts the % weight increase in the carbonaceous heat source as a function of immersion time of the intermediate carbon rods in iron oxide sol.

A similar protocol was followed as in Example 2, except, the immersion time of the intermediate carbon rods in the iron oxide sol was varied. The resulting weight increase for the final carbon heat source versus immersion time is depicted in FIG. 3.

EXAMPLE 4

CO/CO$_2$ Emitted Gas Ratio

Figure 4:
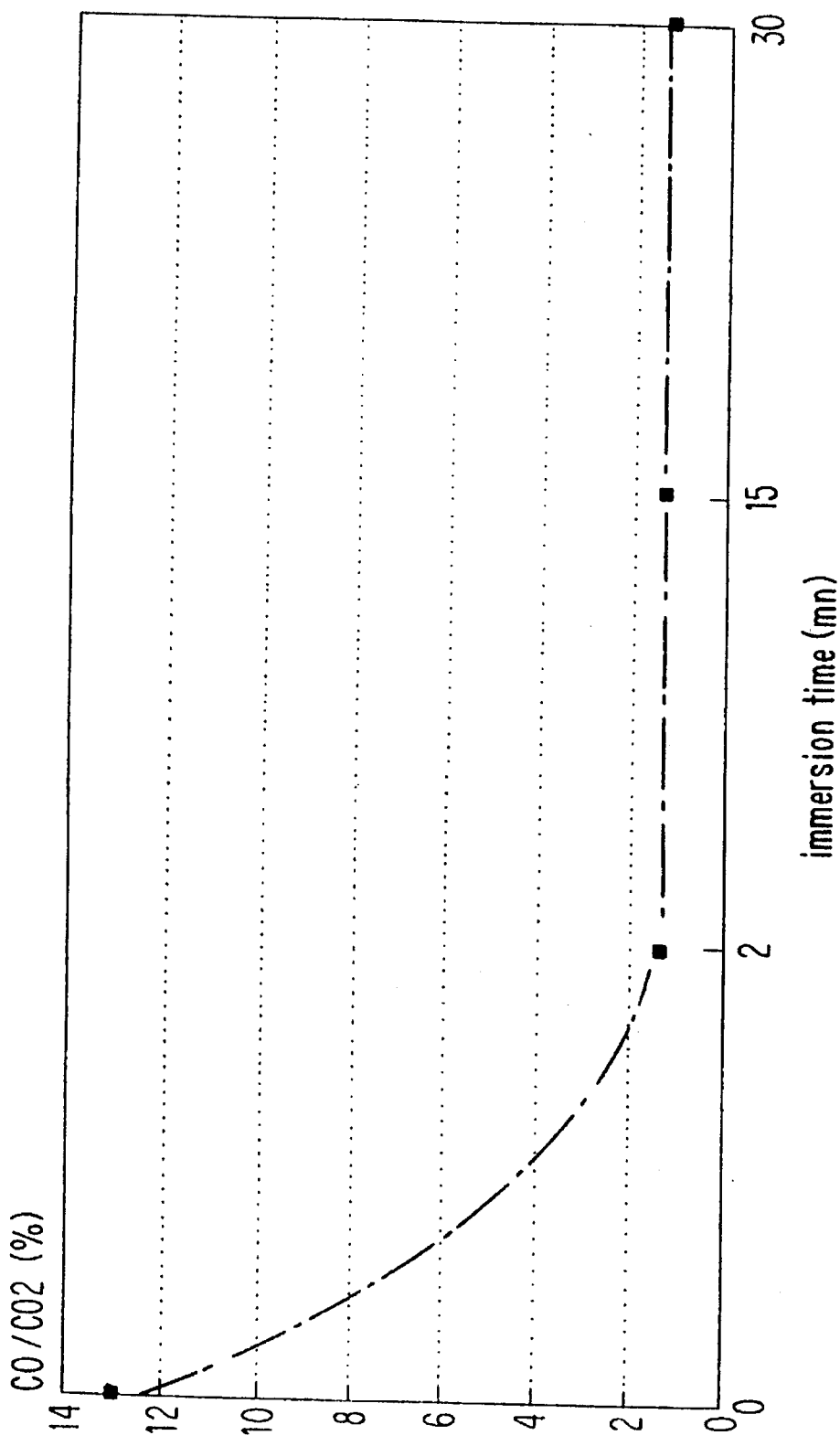
FIG. 4 depicts the ratio of $CO/CO_2$ emitted gas as a function of immersion time of the intermediate carbon rods in iron oxide sol.

Smoldering tests were performed (using a modified oxygen index technique) in a 20% oxygen/80% nitrogen atmosphere. The variation of the ratio of CO/CO$_2$ emitted gases (determined by FTIR Spectroscopy) versus the immersion time is shown in FIG. 4. The CO/CO$_2$ ratios are much lower for iron oxide loaded carbon pellets than for the control carbon pellets (with no iron oxide load). A 2 minutes immersion time resulted in the observed minimum for CO/CO$_2$ ratio (1%).

EXAMPLE 5

Heat Release

Differential Scanning Calorimetry (DSC) was used to determine the heat released during the smoldering of the pellets in air. The results appear in Table I below.

TABLE I

| Immersion time (mn) | Heat Release (Kcal/G) |
|---|---|
| 2 | −3.39 |
| 15 | −3.39 |
| 30 | −3.39 |

Thus, it is seen that this invention provides a method of contacting a carbonaceous material with a sol containing metal oxide precursor to produce a heat source that forms very little carbon monoxide upon combustion. One skilled in the art will appreciate that the present invention can be practiced by other than the described embodiments, which are presented for the purpose of illustration and not of limitation and that the present invention is limited only by the claims that follow.

We claim:
1. A smoking article comprising:
   a carbonaceous heat source made according to the method comprising the steps of:
   a) mixing a hydroxylated organic chemical, wherein the hydroxylated chemical compound is selected from the group consisting of diols and triols, and a metal oxide precursor to form a sol, wherein the metal oxide precursor is selected such that the formed metal oxide is an iron oxide, the metal oxide capable of reducing an amount of carbon monoxide produced upon combustion of the carbonaceous material;
   b) heating the mixture from step a) to form a polymeric or oligomeric species containing the selected metal and organic species;
   c) treating a carbonaceous material with the sol; and d) heating the product of step e) to evaporate liquid from the sol and then decompose the polymeric or oligomeric species of the sol to form the metal oxide to form a heat source comprising the carbonaceous material and the metal oxide, wherein said carbonaceous heat source is formed into a shape which fits within the smoking article and gases flow past or through it to be heated, and, a flavor bed which is then heatable by the thus heated gases to release flavor, whereby flavor is provided to a smoker.

2. The smoking article according to claim 1, wherein the hydroxylated organic chemical is selected from the group consisting of ethylene glycol and propylene glycol.

3. The smoking article according to claim 1, wherein the carbonaceous material of step c) is treated with the sol for between about 1 minute and about 10 minutes.

4. The smoking article according to claim 1, wherein the carbonaceous material of step c) is treated with the sol by painting, immersing or dipping.

5. The smoking article according to claim 1, wherein the carbonaceous material of step c) is treated with the sol by spraying.

6. The smoking article according to claim 5, wherein the carbonaceous material is transported in a continuous fashion during step c) and step d).

7. The smoking article according to claim 1, wherein the product of step c) is heated at between about 150° C. and about 300° C. for about 60 minutes.

8. The smoking article according to claim 1, wherein the carbonaceous material of step c) is a carbon rod, wherein the carbon rod has a length of about 30 cm an a diameter of between about 3.0 mm and about 8.0 mm.

9. The smoking article according to claim 1, wherein the weight increase of the product of step d) over the carbonaceous material of step c) before treatment with the sol is between about 0.1% and about 20%.

10. The smoking article according to claim 1, wherein the weight increase of the product of step d) over the carbonaceous material of step c) before treatment with the sol is between about 2% and about 15%.

11. The smoking article according to claim 1, wherein the weight increase of the product of step d) over the carbonaceous material of step c) before treatment with the sol is between about 4% and about 8%.

12. The smoking article according to claim 1, wherein the density of the product of step d) is between about 0.5 gm/cc and about 1.5 gm/cc.

13. The smoking article according to claim 1, wherein the density of the product of step d) is between about 0.4 gm/cc and about 2.25 gm/cc.

14. The smoking article according to claim 1, wherein the product of step c) is heated between about 100° C. and about 400° C. for about ninety minutes.

15. The smoking article according to claim 1, wherein the metal oxide precursor is selected such that the metal oxide is ferric oxide.

16. The smoking article according to claim 1, wherein the particle size of the carbonaceous material is $\leq 300\mu$.

17. The smoking article according to claim 1, wherein the density of the product of step d) is $\leq 2.25$ gm/cc.

18. The smoking article according to claim 1, wherein step b) comprises heating the mixture from step a) to between about 60° C. and about 150° C.

19. The smoking article according to claim 18, wherein the product of step c) is heated between about 100° C. and about 400° C. for about ninety minutes.

20. The smoking article according to claim 1, wherein the carbonaceous material of step c) is treated with the sol for between about five minutes and about ten minutes.

21. The smoking article according to claim 1, wherein the weight increase of the product of step d) over the carbonaceous material of step c) before treatment with the sol is between about 4% and about 6%.

22. The smoking article according to claim 1, wherein the surface area of the carbonaceous material is between about 200 $m^2$/gm and 800 $m^2$/gm.

23. The smoking article according to claim 1, wherein the metal oxide precursor is hydrated iron nitrate.

24. The smoking article according to claim 1, wherein the metal oxide precursor is iron nitrate.

25. The smoking article according to claim 1, wherein the metal oxide precursor is iron oxalate.

26. The smoking article according to claim 1, wherein the metal oxide precursor is iron acetyl acetonate.

27. The smoking article according to claim 1, wherein the carbonaceous material further comprises a burn additive.

28. The smoking article according to claim 27, wherein the burn additive is selected from the group consisting of perchlorates, chlorates, nitrates, and permanganates.

29. The smoking article according to claim 1, wherein the surface area of the carbonaceous material is between about 0.5 $m^2$/gm and 2000 $m^2$/gm.

30. The smoking article according to claim 1, wherein the surface area of the carbonaceous material is between about 100 $m^2$/gm and 800 $m^2$/gm.

31. The smoking article according to claim 1, wherein the surface area of the metal oxide is between about 4.0 $m^2$/g and 200 $m^2$/g.

32. The smoking article according to claim 1, wherein the particle size of the metal oxide is between about 200 Å and 40$\mu$.

33. The smoking article according to claim 1, wherein the particle size of the metal oxide is between about 800 Å and 5$\mu$.

* * * * *